(12) United States Patent
Peng

(10) Patent No.: US 11,733,494 B2
(45) Date of Patent: Aug. 22, 2023

(54) CAMERA OPTICAL LENS

(71) Applicant: AAC Optics (Changzhou) Co., Ltd., Changzhou (CN)

(72) Inventor: Haichao Peng, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 450 days.

(21) Appl. No.: 17/134,503

(22) Filed: Dec. 28, 2020

(65) Prior Publication Data

US 2021/0382277 A1   Dec. 9, 2021

(30) Foreign Application Priority Data

Jun. 9, 2020 (CN) .......................... 202010515559.3

(51) Int. Cl.
*G02B 13/00* (2006.01)
*G02B 9/62* (2006.01)

(52) U.S. Cl.
CPC ............ *G02B 13/0045* (2013.01); *G02B 9/62* (2013.01)

(58) Field of Classification Search
CPC ......... G02B 13/0045; G02B 9/62; G02B 9/64
See application file for complete search history.

(56) References Cited

U.S. PATENT DOCUMENTS

| | | | |
|---|---|---|---|
| 2014/0071542 A1* | 3/2014 | Jung .................. | G02B 13/0045 359/713 |
| 2017/0010444 A1* | 1/2017 | Teraoka .................... | G02B 9/62 |
| 2020/0041766 A1* | 2/2020 | Chen ........................ | G02B 9/62 |

* cited by examiner

*Primary Examiner* — George G. King
*Assistant Examiner* — Anna Elizabeth Smith
(74) *Attorney, Agent, or Firm* — W&G Law Group

(57) ABSTRACT

A camera optical lens includes successively from an object side to an image side: a first lens, a second lens, a third lens, a fourth lens, a fifth lens, and a sixth lens. The camera optical lens satisfies 58.00≤v1≤82.00; 2.30≤R5/R6; and 0.80≤d8/d10≤1.20, where v1 denotes an abbe number of the first lens, R5 denotes a curvature radius of an object side surface of the third lens, R6 denotes a curvature radius of an image side surface of the third lens, d8 denotes an on-axis distance from an image side surface of the fourth lens to an object side surface of the fifth lens, and d10 denotes an on-axis distance from an image side surface of the fifth lens to an object side surface of the sixth lens. The camera optical lens meets design requirements of a large aperture, a wide angle, and ultra-thinness while having good optical performance.

10 Claims, 9 Drawing Sheets

US 11,733,494 B2

CAMERA OPTICAL LENS

TECHNICAL FIELD

The present disclosure relates to the field of optical lenses, and in particular, to a camera optical lens applicable to portable terminal devices such as smart phones and digital cameras, as well as camera devices such as monitors and PC lenses.

BACKGROUND

In recent years, with the emergence of smart phones, the demand for miniaturized photographic lenses is increased day by day. Generally, either a Charge Coupled Device (CCD) or a Complementary Metal-Oxide Semiconductor Sensor (CMOS Sensor) is used as a photosensitive device of a general camera lens. Due to the improvement of the semiconductor manufacturing technology, the pixel size of the photosensitive device is reduced. In addition, the development trend of electronic products at present is having good functions with a thin and short appearance. Therefore, a miniaturized camera lens with a good imaging quality has already become the mainstream in the current market.

In order to obtain better imaging quality, a traditional lens mounted on a mobile phone camera usually adopts a three-piece or a four-piece lens structure. Moreover, with the development of technologies and the increase in users' diversified demands, and as the pixel area of photosensitive devices is becoming smaller and smaller and the requirement of the system on imaging quality is improving constantly, five-piece, six-piece and seven-piece lens structures gradually appear in lens designs. Although the common six-piece lenses have good optical performance, their settings on refractive power, lens spacing and lens shape still have some irrationality, which results in that the lens structure cannot achieve a high optical performance while satisfying the design requirement for a long focal length.

SUMMARY

In view of the above problems, an objective of the present disclosure is to provide a camera optical lens that meets design requirements of a large aperture, a wide angle, and ultra-thinness while having good optical performance.

In order to solve the above technical problems, a camera optical lens is provided according to an embodiment of the present disclosure. The camera optical lens includes from an object side to an image side: a first lens having positive refractive power; a second lens having negative refractive power; a third lens having negative refractive power; a fourth lens; a fifth lens having positive refractive power; and a sixth lens having negative refractive power, wherein the camera optical lens satisfies:

$58.00 \le v1 \le 82.00$;

$2.30 \le R5/R6$; and $0.80 \le d8/d10 \le 1.20$, where v1 denotes an abbe number of the first lens, R5 denotes a curvature radius of an object side surface of the third lens, R6 denotes a curvature radius of an image side surface of the third lens, d8 denotes an on-axis distance from an image side surface of the fourth lens to an object side surface of the fifth lens, and d10 denotes an on-axis distance from an image side surface of the fifth lens to an object side surface of the sixth lens.

As an improvement, the camera optical lens satisfies: $-7.00 \le f2/f \le -2.50$, where f denotes a focal length of the camera optical lens, and f2 denotes a focal length of the second lens.

As an improvement, the camera optical lens satisfies:

$0.45 \le f1/f \le 1.58$;

$-3.84 \le (R1+R2)/(R1-R2) \le -1.10$; and $0.07 \le d1/TTL \le 0.23$, where f denotes a focal length of the camera optical lens, f1 denotes a focal length of the first lens, R1 denotes a curvature radius of an object side surface of the first lens, R2 denotes an curvature radius of an image side surface of the first lens, d1 denotes an on-axis thickness of the first lens, and TTL denotes a total optical length from the object side surface of the first lens to an image plane of the camera optical lens along an optic axis.

As an improvement, the camera optical lens satisfies:

$1.78 \le (R3+R4)/(R3-R4) \le 14.51$; and $0.02 \le d3/TTL \le 0.07$, where R3 denotes a curvature radius of an object side surface of the second lens, R4 denotes a curvature radius of an image side surface of the second lens, d3 denotes an on-axis thickness of the second lens, and TTL denotes a total optical length from an object side surface of the first lens to an image plane of the camera optical lens along an optic axis.

As an improvement, the camera optical lens satisfies:

$-45.14 \le f3/f \le -8.18$;

$0.50 \le (R5+R6)/(R5-R6) \le 30.77$; and $0.04 \le d5/TTL \le 0.15$, where f denotes a focal length of the camera optical lens, f3 denotes a focal length of the third lens, d5 denotes an on-axis thickness of the third lens, and TTL denotes a total optical length from an object side surface of the first lens to an image plane of the camera optical lens along an optic axis.

As an improvement, the camera optical lens satisfies:

$-39.66 \le f4/f \le 630.56$;

$-70.40 \le (R7+R8)/(R7-R8) \le 26.46$; and $0.03 \le d7/TTL \le 0.09$, where f denotes a focal length of the camera optical lens, f4 denotes a focal length of the fourth lens, R7 denotes a curvature radius of an object side surface of the fourth lens, R8 denotes a curvature radius of an image side surface of the fourth lens, d7 denotes an on-axis thickness of the fourth lens, and TTL denotes a total optical length from an object side surface of the first lens to an image plane of the camera optical lens along an optic axis.

As an improvement, the camera optical lens satisfies:

$0.32 \le f5/f \le 1.11$;

$0.22 \le (R9+R10)/(R9-R10) \le 00.76$; and $0.07 \le d9/TTL \le 00.22$ where f denotes a focal length of the camera optical lens, f5 denotes a focal length of the fifth lens, R9 denotes a curvature radius of the object side surface of the fifth lens, R10 denotes a curvature radius of the image side surface of the fifth lens, d9 denotes an on-axis thickness of the fifth lens, and TTL denotes a total optical length from an object side surface of the first lens to an image plane of the camera optical lens along an optic axis.

As an improvement, the camera optical lens satisfies:

$-1.10 \leq f6/f \leq -0.35;$ $0.20 \leq (R11+R12)/(R11-R12) \leq 0.70;$ and $0.04 \leq d11/TTL \leq 0.13,$ where f denotes a focal length of the camera optical lens, f6 denotes a focal length of the sixth lens, R11 denotes a curvature radius of the object side surface of the sixth lens, R12 denotes a curvature radius of an image side surface of the sixth lens, d11 denotes an on-axis thickness of the sixth lens, and TTL denotes a total optical length from an object side surface of the first lens to an image plane of the camera optical lens along an optic axis.

As an improvement, the camera optical lens satisfies: $TTL/IH \leq 1.43$, where IH denotes an image height of the camera optical lens, and TTL denotes a total optical length from an object side surface of the first lens to an image plane of the camera optical lens along an optic axis.

As an improvement, the first lens is made of glass.

The present disclosure has the following beneficial effects: the camera optical lens according to the present disclosure has good optical performance and has the characteristics of a large aperture, a wide angle, and ultra-thinness, and is particularly applicable to mobile phone camera lens assemblies and WEB camera lenses composed of high pixel CCD, CMOS, and other camera elements.

BRIEF DESCRIPTION OF DRAWINGS

In order to more clearly illustrate technical solutions in embodiments of the present disclosure, the accompanying drawings used in the embodiments are briefly introduced as follows. Apparently, the drawings described as follows are merely part of the embodiments of the present disclosure, and other drawings can also be acquired by those of ordinary skill in the art without paying creative efforts. In the drawings.

DESCRIPTION OF EMBODIMENTS

To make the objectives, technical solutions, and advantages of the present disclosure clearer, embodiments of the present disclosure will be described in detail as follows with reference to the accompanying drawings. However, those of ordinary skill in the art can understand that many technical details have been put forward in each embodiment of the present disclosure in order to make readers better understand the present disclosure. Even without these technical details and various changes and modifications based on the following embodiments, the technical solutions claimed in the present disclosure can also be implemented.

First Embodiment

Figure 1:
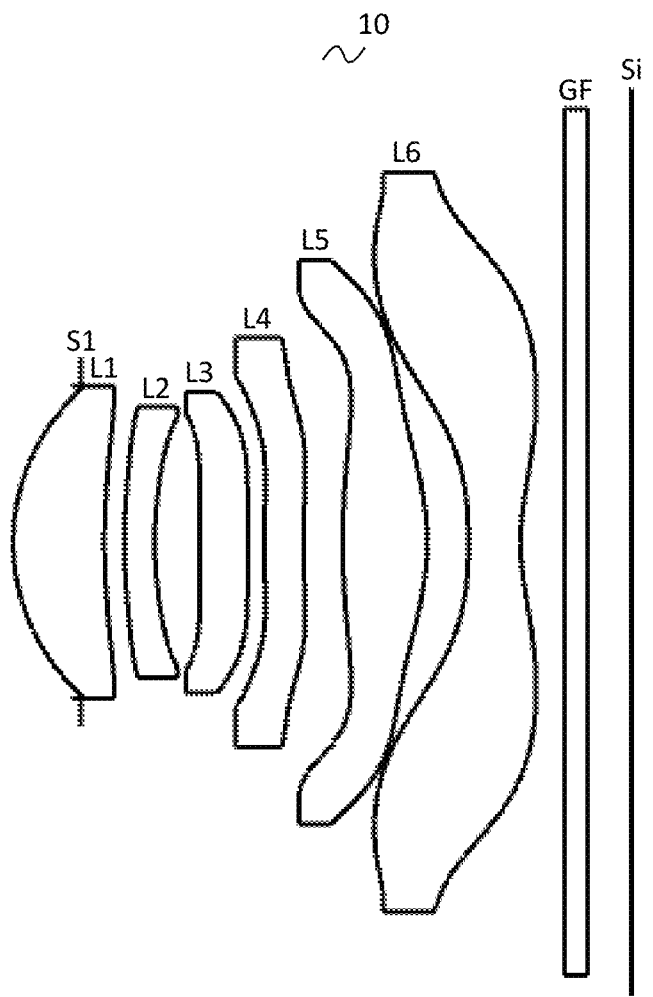
FIG. 1 is a schematic structural diagram of a camera optical lens according to a first embodiment of the present disclosure.

Referring to the drawings, the present disclosure provides a camera optical lens 10. FIG. 1 illustrates the camera optical lens 10 according to the first embodiment of the present disclosure. The camera optical lens 10 includes six lenses. Specifically, the camera optical lens 10 includes successively from an object side to an image side: an aperture S1, a first lens L1, a second lens L2, a third lens L3, a fourth lens L4, a fifth lens L5, and a sixth lens L6. An optical element such as an optical filter GF may be provided between the sixth lens L6 and an image surface Si.

In this embodiment, the first lens L1 has positive refractive power, the second lens L2 has negative refractive power, the third lens L3 has negative refractive power, the fourth lens L4 has negative refractive power, the fifth lens L5 has positive refractive power, and the sixth lens L6 has negative refractive power.

In this embodiment, the first lens L1 is made of glass, the second lens L2 is made of a plastic material, the third lens L3 is made of a plastic material, the fourth lens L4 is made of a plastic material, the fifth lens L5 is made of a plastic material, and the sixth lens L6 is made of a plastic material.

In this embodiment, an abbe number of the first lens L1 is defined as v1, which satisfies the following relational expression: $58.00 \leq v1 \leq 82.00$. The range of the dispersion coefficient of the first lens is specified, which is conducive to correcting chromatic aberration and improving system imaging performance.

A curvature radius of an object side surface of the third lens L3 is defined as R5, and a curvature radius of an image side surface of the third lens L3 is defined as R6, which satisfy the following relational expression: $2.30 \leq R5/R6$. The shape of the third lens is specified. Within the range of the conditional expression, a deflection degree of light passing through the lens can be alleviated, thus effectively reducing the aberration.

An on-axis distance from an image side surface of the fourth lens L4 to an object side surface of the fifth lens L5 is defined as d8, and an on-axis distance from an image side surface of the fifth lens L5 to an object side surface of the sixth lens L6 is defined as d10, which satisfy the following relational expression: $0.80 \leq d8/d10 \leq 1.20$. When d8/d10 satisfies the condition, the position of the fifth lens can be effectively allocated, which is conducive to lens assembly.

A focal length of the camera optical lens 10 is defined as f, and a focal length of the second lens L2 is defined as f2, which satisfy the following relational expression: $-7.00 \leq f2/$ f≤−2.50. A ratio of the focal length of the second lens to the focal length of the system is specified. Within the range of the conditional expression, it is conducive to improving performance of an optical system.

In this embodiment, the object side surface of the first lens L1 is a convex surface at a paraxial position, and the image side surface thereof is a concave surface at the paraxial position.

A focal length of the camera optical lens 10 is defined as f, and a focal length of the first lens L1 is defined as f1, which satisfy the following relational expression: $0.45 \leq f1/f \leq 1.58$. A ratio of the focal length of the first lens L1 to the total focal length is specified. Within the specified range, the first lens has appropriate positive refractive power, which is conducive to reducing system aberration, and is conducive to the development of ultra-thin and wide-angle lenses. In an embodiment, $0.71 \leq f1/f \leq 1.26$ is satisfied.

A curvature radius of an object side surface of the first lens L1 is R1, and a curvature radius of an image side surface of the first lens L1 is R2, which satisfy the following relational expression: $-3.84 \leq (R1+R2)/(R1-R2) \leq -1.10$. The shape of the first lens L1 is reasonably controlled, so that a spherical aberration of the system can be effectively correct by the first lens L1. In an embodiment, $-2.40 \leq (R1+R2)/(R1-R2) \leq -1.38$ is satisfied.

An on-axis thickness of the first lens L1 is d1, and a total track length of the camera optical lens 10 is TTL, which satisfy the following relational expression: $0.07 \leq d1/TTL \leq 0.23$. This is conducive to embodiment of ultra-thinness within the range of the conditional expression. Optionally, $0.12 \leq d1/TTL \leq 0.18$ is satisfied.

In this embodiment, the object side surface of the second lens L2 is a convex surface at a paraxial position, and the image side surface thereof is a concave surface at the paraxial position.

A curvature radius of an object side surface of the second lens L2 is defined as R3, and a curvature radius of an image side surface of the second lens L2 is defined as R4, which satisfy the following relational expression: $1.78 \leq (R3+R4)/(R3-R4) \leq 14.51$. The shape of the second lens L2 is specified. Within this range, it is conducive to correcting the problem of longitudinal aberration with the development of ultra-thin and wide-angle lenses. In an embodiment, $2.85 \leq (R3+R4)/(R3-R4) \leq 11.61$ is satisfied.

An on-axis thickness of the second lens L2 is d3, and a total track length of the camera optical lens 10 is TTL, which satisfy the following relational expression: $0.02 \leq d3/TTL \leq 0.07$. Within the range of the conditional expression, it is conducive to implementation of ultra-thinness. In an embodiment, $0.04 \leq d3/TTL \leq 0.06$ is satisfied.

In this embodiment, the object side surface of the third lens L3 is a convex surface at a paraxial position, and the image side surface thereof is a concave surface at the paraxial position.

A focal length of the camera optical lens 10 is defined as f, and a focal length of the third lens L3 is defined as f3, which satisfy the following relational expression: $-45.14 \leq f3/f \leq -8.18$. By reasonably distributing the refractive power, the system is enabled to have good imaging quality and low sensitivity. In an embodiment, $-28.21 \leq f3/f \leq -10.23$ is satisfied.

A curvature radius of an object side surface of the third lens L3 is R5, and a curvature radius of an image side surface of the third lens L3 is R6, which satisfy the following relational expression: $0.50 \leq (R5+R6)/(R5-R6) \leq 3.77$. The shape of the third lens is specified. Within the specified range of the conditional expression, a deflection degree of light passing through the lens can be alleviated, thereby effectively reducing the aberration. In an embodiment, $0.80 \leq (R5+R6)/(R5-R6) \leq 3.02$ is satisfied.

An on-axis thickness of the third lens L3 is d5, and a total track length of the camera optical lens 10 is TTL, which satisfy the following relational expression: $0.04 \leq d5/TTL \leq 0.15$. Within the range of the conditional expression, it is conducive to implementation of ultra-thinness. In an embodiment, $0.06 \leq d5/TTL \leq 0.12$ is satisfied.

In this embodiment, the object side surface of the fourth lens L4 is a convex surface at a paraxial position, and the image side surface thereof is a concave surface at the paraxial position.

A focal length of the camera optical lens 10 is defined as f, and a focal length of the fourth lens L4 is defined as f4, which satisfy the following relational expression: $-39.66 \leq f4/f \leq 63.56$. A ratio of the focal length of the fourth lens to the focal length of the system is specified, which helps improve the performance of the optical system within the range of the conditional expression. In an embodiment, $-24.79 \leq f4/f \leq 50.85$ is satisfied.

A curvature radius of an object side surface of the fourth lens L4 is R7, and a curvature radius of an image side surface of the fourth lens L4 is R8, which satisfy the following relational expression: $-70.40 \leq (R7+R8)/(R7-R8) \leq 26.46$. The shape of the fourth lens L4 is specified. Within this range, it is conducive to correcting the problems such as off-axis aberration with the development of ultra-thin and wide-angle lenses. In an embodiment, $-44.00 \leq (R7+R8)/(R7-R8) \leq 21.17$ is satisfied.

An on-axis thickness of the fourth lens L4 is d7, and a total track length of the camera optical lens 10 is TTL, which satisfy the following relational expression: $0.03 \leq d7/TTL \leq 0.09$. Within the range of the conditional expression, it is conducive to implementation of ultra-thinness. In an embodiment, $0.04 \leq d7/TTL \leq 0.08$ is satisfied.

In this embodiment, the object side surface of the fifth lens L5 is a convex surface at a paraxial position, and the image side surface thereof is a convex surface at the paraxial position.

A focal length of the camera optical lens 10 is defined as f, and a focal length of the fifth lens L5 is defined as f5, which satisfy the following relational expression: $0.32 \leq f5/f \leq 1.11$. The limitation on the fifth lens L5 can effectively flatten a light angle of the camera lens, and reduce the tolerance sensitivity. In an embodiment, $0.51 \leq f5/f \leq 0.89$ is satisfied.

A curvature radius of an object side surface of the fifth lens L5 is R9, and a curvature radius of an image side surface of the fifth lens L5 is R10, which satisfy the following relational expression: $0.22 \leq (R9+R10)/(R9-R10) \leq 0.76$. The shape of the fifth lens L5 is specified. Within this range, it is conducive to correcting the problems such as off-axis aberration with the development of ultra-thin and wide-angle lenses. In an embodiment, $0.35 \leq (R9+R10)/(R9-R10) \leq 0.61$ is satisfied.

An on-axis thickness of the fifth lens L5 is d9, and a total track length of the camera optical lens 10 is TTL, which satisfy the following relational expression: $0.07 \leq d9/TTL \leq 0.22$. Within the range of the conditional expression, it is conducive to implementation of ultra-thinness. In an embodiment, $0.11 \leq d9/TTL \leq 0.18$ is satisfied.

In this embodiment, the object side surface of the sixth lens L6 is a concave surface at a paraxial position, and the image side surface thereof is a concave surface at the paraxial position.

A focal length of the entire camera optical lens 10 is defined as f, and a focal length of the sixth lens L6 is defined as f6, which satisfy the following relational expression: $-1.10 \leq f6/f \leq -0.35$. By reasonably distributing the refractive power, the system is enabled to have good imaging quality and low sensitivity. In an embodiment, $-0.68 \leq f6/f \leq -0.44$ is satisfied.

A curvature radius of an object side surface of the sixth lens L6 is R11, and a curvature radius of an image side surface of the sixth lens L6 is R12, which satisfy the following relational expression: $0.20 \leq (R11+R12)/(R11-R12) \leq 0.70$. The shape of the sixth lens L6 is specified. Within the range of the conditional expression, it is conducive to correcting the problems such as off-axis aberration with the development of ultra-thin and wide-angle lenses. In an embodiment, $0.31 \leq (R11+R12)/(R11-R12) \leq 0.56$ is satisfied.

An on-axis thickness of the sixth lens L6 is d11, and a total track length of the camera optical lens 10 is TTL, which satisfy the following relational expression: $0.04 \leq d11/TTL \leq 0.13$. Within the range of the conditional expression, it is conducive to implementation of ultra-thinness. In an embodiment, $0.06 \leq d11/TTL \leq 0.10$ is satisfied.

In this embodiment, an image height of the camera optical lens 10 is IH, and a total track length of the camera optical lens 10 is TTL, which satisfy the following relational expression: $TTL/IH \leq 1.43$. It is conducive to implementation of ultra-thinness.

In this embodiment, a field of view FOV of the camera optical lens 10 is greater than or equal to 79°, thereby implementing a wide angle.

In this embodiment, an F number FNO of the camera optical lens 10 is less than or equal to 1.65, thereby implementing a large aperture. The camera optical lens has good imaging performance.

When the above relations are satisfied, the camera optical lens 10 can meet design requirements of a large aperture, a wide angle, and ultra-thinness while having good optical performance. According to the characteristics of the optical lens 10, the optical lens 10 is particularly applicable to mobile phone camera lens assemblies and WEB camera lenses composed of high pixel CCD, CMOS, and other camera elements.

The camera optical lens 10 of the present disclosure will be described below with examples. Symbols listed in the examples are shown as below. The unit of focal length, on-axis distance, curvature radius, on-axis thickness, inflection point position, and arrest point position is mm.

TTL: total track length (an on-axis distance from the object side surface of the first lens L1 to an imaging surface), in units of mm.

F number FNO: ratio of an effective focal length of the camera optical lens to an entrance pupil diameter.

In an embodiment, the object side surface and/or the image side surface of the lens may be provided with an inflection point and/or an arrest point to meet high-quality imaging requirements. For specific implementation schemes, reference may be made to the following description.

Table 1 and Table 2 show design data of the camera optical lens 10 according to the first embodiment of the present disclosure.

TABLE 1

|     | R      | d     |        | nd     |     | vd    |
|-----|--------|-------|--------|--------|-----|-------|
| S1  | ∞      | d0=   | −0.628 |        |     |       |
| R1  | 1.887  | d1=   | 0.840  | nd1    | 1.5267 | v1 | 76.60 |
| R2  | 5.991  | d2=   | 0.185  |        |     |       |
| R3  | 4.801  | d3=   | 0.280  | nd2    | 1.6700 | v2 | 19.39 |
| R4  | 3.517  | d4=   | 0.418  |        |     |       |
| R5  | 70.648 | d5=   | 0.437  | nd3    | 1.5444 | v3 | 55.82 |
| R6  | 21.926 | d6=   | 0.150  |        |     |       |
| R7  | 5.331  | d7=   | 0.360  | nd4    | 1.6153 | v4 | 25.94 |
| R8  | 4.759  | d8=   | 0.364  |        |     |       |
| R9  | 6.520  | d9=   | 0.779  | nd5    | 1.5346 | v5 | 55.69 |
| R10 | −2.252 | d10=  | 0.380  |        |     |       |
| R11 | −4.685 | d11=  | 0.480  | nd6    | 1.5444 | v6 | 55.82 |
| R12 | 2.040  | d12=  | 0.405  |        |     |       |
| R13 | ∞      | d13=  | 0.210  | ndg    | 1.5168 | vg | 64.17 |
| R14 | ∞      | d14=  | 0.402  |        |     |       |

Meanings of the symbols in table 1 are as follows.

S1: aperture;

R: curvature radius at a center of an optical surface;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6

R13: curvature radius of the object side surface of the optical filter GF;

R14: curvature radius of the image side surface of the optical filter GF;

d: on-axis thickness of the lens and on-axis distance between the lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;
d12: on-axis distance from the image side surface of the sixth lens L6 to the object side surface of the optical filter GF;
d13: on-axis thickness of the optical filter GF;
d14: on-axis distance from the image side surface of the optical filter GF to an image surface;
nd: refractive index of d-line;
nd1: refractive index of d-line of the first lens L1;
nd2: refractive index of d-line of the second lens L2;
nd3: refractive index of d-line of the third lens L3;
nd4: refractive index of d-line of the fourth lens L4;
nd5: refractive index of d-line of the fifth lens L5;
nd6: refractive index of d-line of the sixth lens L6;
ndg: refractive index of d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6; and
vg: abbe number of the optical filter GF.

Table 2 shows aspheric data of respective lenses in the camera optical lens 10 according to the first embodiment of the present disclosure.

In the above formula (1), x is a vertical distance between a point on an aspheric curve and the optic axis, and y is an aspheric depth (a vertical distance between a point having a distance of x from the optical axis on an aspheric surface and a tangent plane tangent to a vertex on an aspheric optic axis).

For convenience, the aspheric surface of each lens surface uses the aspheric surface shown in the above formula (1). However, the present disclosure is not limited to the aspheric polynomial form represented by the formula (1).

Table 3 and Table 4 show design data of inflection points and arrest points of respective lenses in the camera optical lens 10 according to the first embodiment of the present disclosure. P1R1 and P1R2 represent the object side surface and the image side surface of the first lens L1, respectively. P2R1 and P2R2 represent the object side surface and the image side surface of the second lens L2, respectively. P3R1 and P3R2 represent the object side surface and the image side surface of the third lens L3, respectively. P4R1 and P4R2 represent the object side surface and the image side surface of the fourth lens L4, respectively. P5R1 and P5R2 represent the object side surface and the image side surface of the fifth lens L5, respectively. P6R1 and P6R2 represent the object side surface and the image side surface of the sixth lens L6, respectively. Data corresponding to the "reflection point position" column is a vertical distance from the

TABLE 2

| | conic coefficient | Aspheric coefficient | | | | |
|---|---|---|---|---|---|---|
| | k | A4 | A6 | A8 | A10 | A12 |
| R1 | −2.7157E−01 | 3.9175E−03 | 6.3638E−03 | −1.3697E−02 | 2.5113E−02 | −2.9388E−02 |
| R2 | 1.2491E+01 | −3.4572E−02 | 3.3043E−03 | 2.6891E−02 | −8.1390E−02 | 1.2086E−01 |
| R3 | 1.1708E+01 | −7.2713E−02 | 2.4244E−02 | −2.1859E−02 | 9.1397E−02 | −1.9528E−01 |
| R4 | 6.2900E+00 | −5.6072E−02 | 4.6068E−02 | −1.8241E−01 | 6.4339E−01 | −1.2789E+00 |
| R5 | 7.0184E+01 | −4.6658E−02 | 3.9825E−02 | −1.7523E−01 | 3.1411E−01 | −3.6384E−01 |
| R6 | 6.2898E+01 | −1.1241E−01 | 8.1077E−02 | −4.5446E−02 | −1.2846E−01 | 2.5491E−01 |
| R7 | −5.1589E+01 | −1.5418E−01 | 7.8907E−02 | −1.0288E−02 | −3.9723E−02 | −1.9670E−02 |
| R8 | −9.6387E+01 | −5.1314E−02 | −1.1309E−01 | 2.3863E−01 | −2.8963E−01 | 1.8402E−01 |
| R9 | −9.3011E+01 | 4.0608E−02 | −7.7681E−02 | 8.2200E−02 | −5.9582E−02 | 2.7765E−02 |
| R10 | −2.3071E+00 | 7.3035E−02 | −6.0279E−02 | 4.6018E−02 | −2.0373E−02 | 5.0338E−03 |
| R11 | 1.0470E−01 | −1.1836E−01 | 4.4765E−02 | −6.2806E−03 | 3.8472E−04 | −1.0569E−05 |
| R12 | −9.8866E+00 | −8.0703E−02 | 3.9553E−02 | −1.4935E−02 | 4.0219E−03 | −7.3232E−04 |

| | conic coefficient | Aspheric coefficient | | | |
|---|---|---|---|---|---|
| | k | A14 | A16 | A18 | A20 |
| R1 | −2.7157E−01 | 2.1977E−02 | −1.0174E−02 | 2.6590E−03 | −3.0691E−04 |
| R2 | 1.2491E+01 | −1.0548E−01 | 5.3925E−02 | −1.4988E−02 | 1.7424E−03 |
| R3 | 1.1703E+01 | 2.3018E−01 | −1.5648E−01 | 5.7420E−02 | −8.8787E−03 |
| R4 | 6.2900E+00 | 1.5086E+00 | −1.0470E+00 | 3.9160E−01 | −6.2034E−02 |
| R5 | 7.0184E+01 | 2.4668E−01 | −7.8660E−02 | 4.6400E−03 | 4.4035E−03 |
| R6 | 6.2898E+01 | −2.2525E−01 | 1.1657E−01 | −3.4226E−02 | 4.3801E−03 |
| R7 | −5.1689E+01 | 8.4030E−02 | −6.1833E−02 | 1.8786E−02 | −2.1260E−03 |
| R8 | −9.6387E+01 | −7.4649E−02 | 1.7628E−02 | −2.2464E−03 | 1.1985E−04 |
| R9 | −9.3011E+01 | −8.2795E−03 | 1.5003E−03 | −1.4816E−04 | 6.0700E−06 |
| R10 | −2.3071E+00 | −7.3038E−04 | 6.1032E−05 | −2.7049E−06 | 5.0036E−08 |
| R11 | 1.0470E−01 | 1.2557E−05 | −1.8145E−06 | 1.1702E−07 | −2.8708E−09 |
| R12 | −9.8866E+00 | 9.2067E−05 | −6.9035E−06 | 2.8660E−07 | −3.0174E−09 |

In Table 2, k is a conic coefficient, and A4, A6, A8, A10, A12, A14, A16, A18, and A20 are aspheric coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

inflection point disposed on the surface of each lens to the optic axis of the camera optical lens 10. Data corresponding to the "arrest point position" column is a vertical distance from the arrest point disposed on the surface of each lens to the optic axis of the camera optical lens 10.

TABLE 3

|  | Number of inflexion points | Inflexion point position 1 | Inflexion point position 2 | Inflexion point position 3 | Inflexion point position 4 |
|---|---|---|---|---|---|
| P1R1 | 1 | 1.415 | / | / | / |
| P1R2 | 1 | 0.995 | / | / | / |
| P2R1 | 0 | / | / | / | / |
| P2R2 | 0 | / | / | / | / |
| P3R1 | 1 | 0.165 | / | / | / |
| P3R2 | 2 | 0.195 | 1.355 | / | / |
| P4R1 | 1 | 0.305 | / | / | / |
| P4R2 | 4 | 0.365 | 1.375 | 1.675 | 1.835 |
| P5R1 | 2 | 0.538 | 1.995 | / | / |
| P5R2 | 3 | 0.945 | 1.515 | 2.495 | / |
| P6R1 | 2 | 1.445 | 3.105 | / | / |
| P6R2 | 3 | 0.385 | 2.755 | 3.315 | / |

TABLE 4

|  | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 1 | 0.285 |
| P3R2 | 1 | 0.385 |
| P4R1 | 1 | 0.555 |
| P4R2 | 1 | 0.655 |
| P5R1 | 1 | 1.305 |
| P5R2 | 0 | / |
| P6R1 | 1 | 2.635 |
| P6R2 | 1 | 1.555 |

Figure 2:
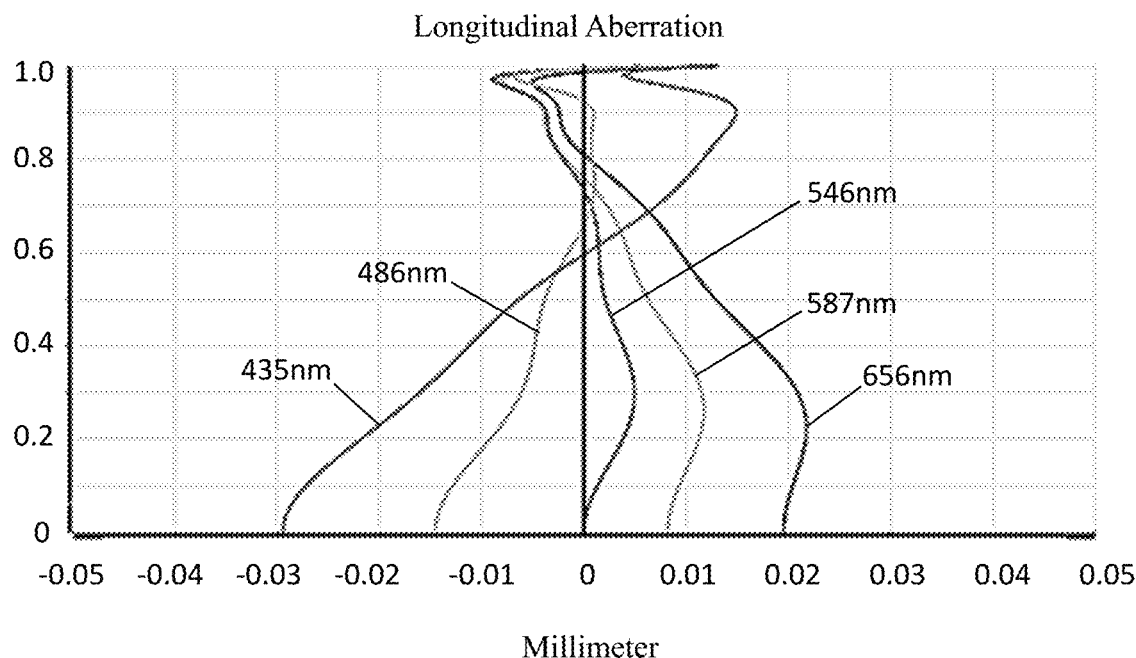
FIG. 2 is a schematic diagram of a longitudinal aberration of the camera optical lens shown in FIG. 1.
Figure 3:
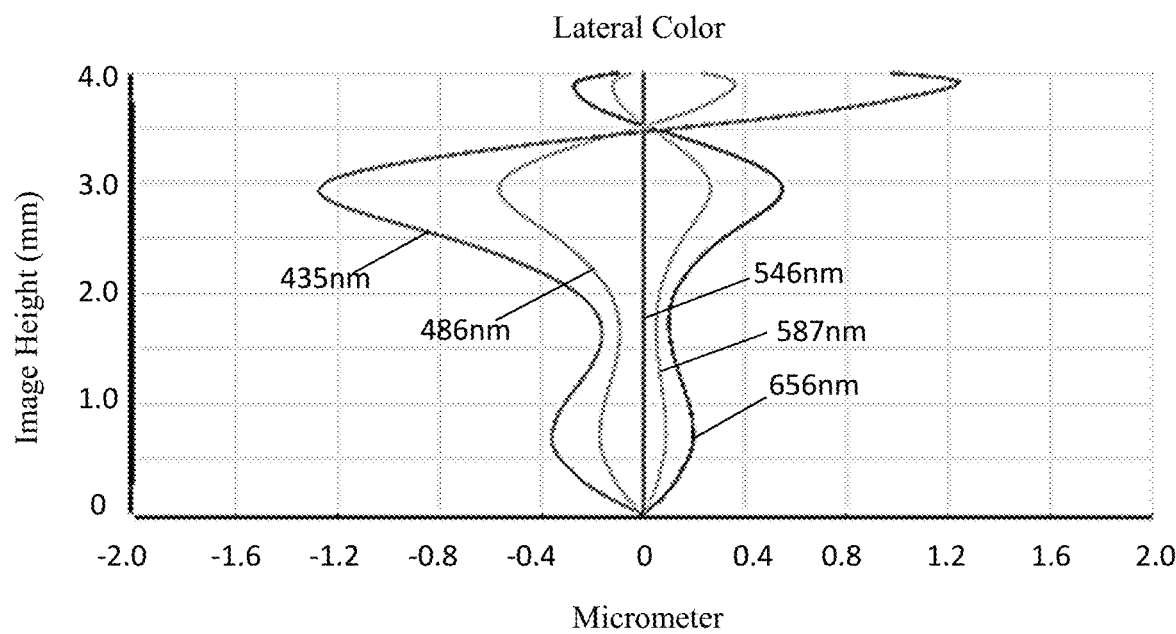
FIG. 3 is a schematic diagram of a lateral color of the camera optical lens shown in FIG. 1.
Figure 4:
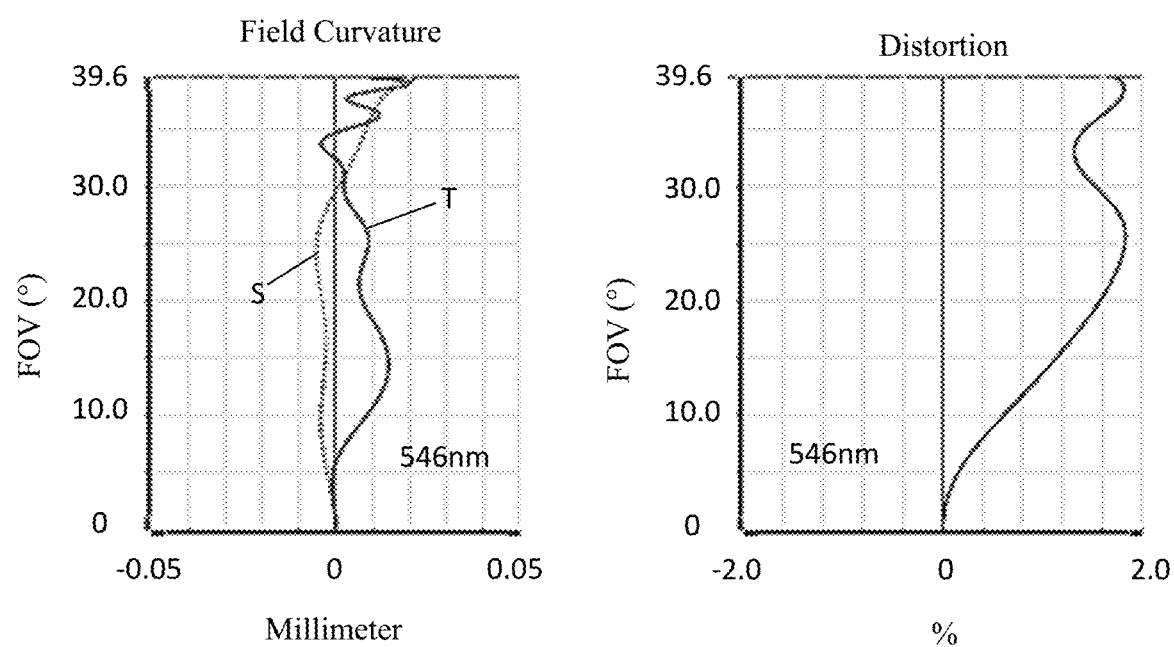
FIG. 4 is schematic diagrams of a field curvature and a distortion of the camera optical lens shown in FIG. 1.
Figure 5:
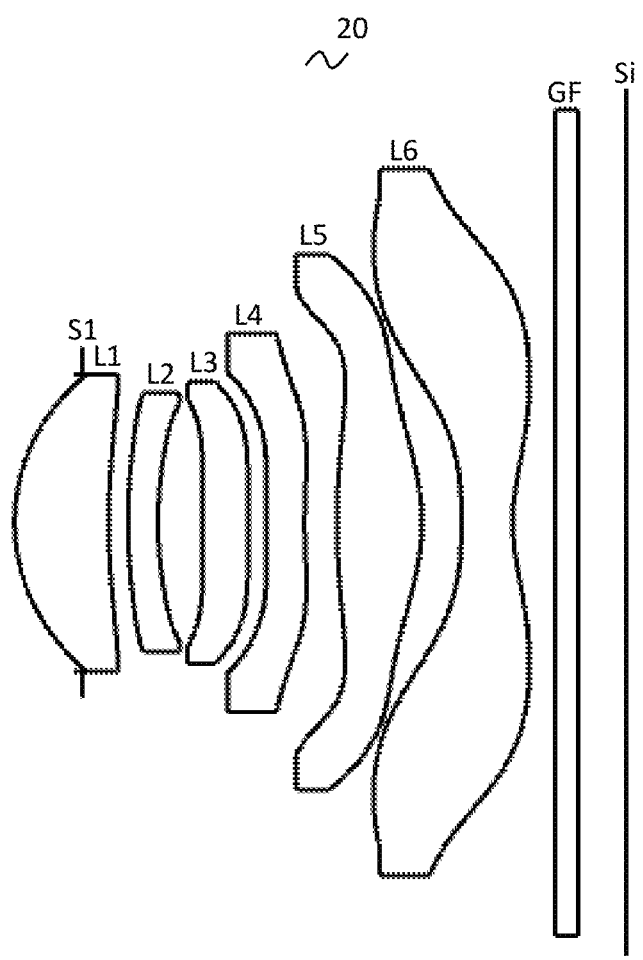
FIG. 5 is a schematic structural diagram of a camera optical lens according to a second embodiment of the present disclosure.

FIG. 2 and FIG. 3 respectively show schematic diagrams of a longitudinal aberration and a lateral color of light with wavelengths of 656 nm, 587 nm, 546 nm, 486 nm, and 435 nm after passing through the camera optical lens 10 in the first embodiment. FIG. 4 shows a schematic diagram of a field curvature and a distortion of light with a wavelength of 546 nm after passing through the camera optical lens 10 in the first embodiment. The field curvature S in FIG. 4 is a field curvature in a sagittal direction, and T is a field curvature in a tangential direction.

Table 13 below shows various values in first, second and third embodiments and values corresponding to parameters specified in the conditional expressions.

As shown in Table 13, the camera optical lens of the first embodiment satisfies the conditional expressions.

In this embodiment, the camera optical lens has an entrance pupil diameter ENPD of 2.881 mm, a full field image height IH of 4.000 mm, and a field of view FOV in a diagonal direction of 79.20°, so that the camera optical lens 10 meets design requirements of a large aperture, a wide angle, and ultra-thinness, has fully corrected on-axis and off-axis aberration, and has excellent optical characteristics.

Second Embodiment

The second embodiment is basically the same as the first embodiment. Symbol have the same meanings as those in the first embodiment. Only differences therebetween will be listed below.

Table 5 and Table 6 show design data of the camera optical lens 20 according to the second embodiment of the present disclosure.

TABLE 5

|  | R | d |  | nd |  | vd |
|---|---|---|---|---|---|---|
| S1 | ∞ | d0= | −0.630 |  |  |  |
| R1 | 1.853 | d1= | 0.876 | nd1 | 1.4970 | v1 | 81.60 |
| R2 | 6.070 | d2= | 0.178 |  |  |  |
| R3 | 4.450 | d3= | 0.281 | nd2 | 1.6700 | v2 | 19.39 |
| R4 | 3.616 | d4= | 0.419 |  |  |  |
| R5 | 77.109 | d5= | 0.420 | nd3 | 1.5444 | v3 | 55.82 |
| R6 | 33.236 | d6= | 0.167 |  |  |  |
| R7 | 8.398 | d7= | 0.360 | nd4 | 1.6153 | v4 | 25.94 |
| R8 | 5.213 | d8= | 0.300 |  |  |  |
| R9 | 6.401 | d9= | 0.793 | nd5 | 1.5346 | v5 | 55.69 |
| R10 | −2.078 | d10= | 0.370 |  |  |  |
| R11 | −5.044 | d11= | 0.476 | nd6 | 1.5444 | v6 | 55.82 |
| R12 | 1.923 | d12= | 0.400 |  |  |  |
| R13 | ∞ | d13= | 0.210 | ndg | 1.5168 | vg | 64.17 |
| R14 | ∞ | d14= | 0.440 |  |  |  |

Table 6 shows aspheric data of respective lenses in the camera optical lens 20 according to the second embodiment of the present disclosure.

TABLE 6

|  | conic coefficient | Aspheric coefficient | | | | |
|---|---|---|---|---|---|---|
|  | k | A4 | A6 | A8 | A10 | A12 |
| R1 | −2.8134E−01 | 3.6891E−03 | 6.0085E−03 | −1.3594E−02 | 2.5035E−02 | −2.9427E−02 |
| R2 | 9.5306E+00 | −3.4115E−02 | 5.7173E−03 | 2.6459E−02 | −8.1463E−02 | 1.2098E−01 |
| R3 | 9.8234E+00 | −7.0454E−02 | 2.1262E−02 | −2.1225E−02 | 9.1718E−02 | −1.9528E−01 |
| R4 | 6.6281E+00 | −5.4686E−02 | 4.1607E−02 | −1.8074E−01 | 6.4348E−01 | −1.2789E+00 |
| R5 | 3.5968E+01 | −5.0478E−02 | 3.5861E−02 | −1.6821E−01 | 3.1122E−01 | −3.6376E−01 |
| R6 | 9.9000E+01 | −9.2017E−02 | 3.2900E−02 | 4.0827E−02 | −2.8532E−01 | 4.8167E−01 |
| R7 | −5.9379E+01 | −1.6489E−01 | 7.6843E−02 | −1.0610E−01 | −4.0284E−02 | −1.9923E−02 |
| R8 | −9.9000E+01 | −7.1628E−02 | −7.8251E−02 | 1.9521E−01 | −2.4099E−01 | 1.7747E−01 |
| R9 | −8.9531E+01 | 3.8123E−02 | −7.3453E−02 | 8.2875E−02 | −6.2144E−02 | 3.0008E−02 |
| R10 | −1.5231E+00 | 8.7098E−02 | −8.1249E−02 | 4.5830E−02 | −2.0268E−02 | 5.0357E−03 |
| R11 | −4.0223E−01 | −1.1898E−01 | 4.4834E−02 | −6.3016E−03 | 3.8352E−04 | −4.0468E−05 |
| R12 | −9.4025E+00 | −8.0404E−02 | 3.9307E−02 | −1.4878E−02 | 4.0209E−03 | −7.5256E−04 |

TABLE 6-continued

|  | conic coefficient | Aspheric coefficient | | | |
|---|---|---|---|---|---|
|  | k | A14 | A16 | A18 | A20 |
| R1 | −2.8134E−01 | 2.1973E−02 | −1.0174E−02 | 2.6598E−03 | −3.0677E−04 |
| R2 | 9.6306E+00 | −1.0548E−01 | 5.3930E−02 | −1.4985E−02 | 1.7421E−03 |
| R3 | 9.8234E+00 | 2.3019E−01 | −1.3645E−01 | 5.7417E−02 | −8.8757E−03 |
| R4 | 6.6281E+00 | 1.3086E+00 | −1.0472E+00 | 3.9460E−01 | −6.2034E−02 |
| R5 | 5.5963E+01 | 2.4675E−01 | −7.8692E−02 | 4.6420E−05 | 4.4055E−03 |
| R6 | 9.9000E+01 | −4.4567E−01 | 2.4700E−01 | −7.6760E−02 | 1.0261E−02 |
| R7 | −5.9379E+01 | 8.4005E−02 | −6.1832E−02 | 1.8792E−02 | −2.1256E−03 |
| R8 | −9.9000E+01 | −7.7758E−02 | 1.9979E−02 | −2.7943E−03 | 1.6493E−04 |
| R9 | −8.9531E+01 | −9.2386E−03 | 7.7156E−03 | −1.7251E−04 | 7.1651E−06 |
| R10 | −1.5281E+00 | −7.2951E−04 | 6.1040E−05 | −2.7319E−06 | 5.1566E−08 |
| R11 | −4.0223E−01 | 1.2364E−03 | −1.8133E−06 | 1.1689E−07 | −2.8702E−09 |
| R12 | −9.4025E+00 | 9.2056E−05 | −6.9030E−06 | 2.8667E−07 | −5.0485E−09 |

Table 7 and Table 8 show design data of inflection points and arrest points of respective lenses in the camera optical lens 20 according to the second embodiment of the present disclosure.

TABLE 7

|  | Number of inflexion points | Inflexion point position 1 | Inflexion point position 2 | Inflexion point position 3 |
|---|---|---|---|---|
| P1R1 | 1 | 1.415 | / | / |
| P1R2 | 1 | 0.945 | / | / |
| P2R1 | 0 | / | / | / |
| P2R2 | 0 | / | / | / |
| P3R1 | 1 | 0.155 | / | / |
| P3R2 | 2 | 0.175 | 1.325 | / |
| P4R1 | 1 | 0.255 | / | / |
| P4R2 | 2 | 0.345 | 1.345 | / |
| P5R1 | 2 | 0.845 | 1.983 | / |
| P5R2 | 3 | 0.905 | 1.555 | 2.535 |
| P6R1 | 2 | 1.435 | 3.095 | / |
| P6R2 | 3 | 0.555 | 2.775 | 3.315 |

TABLE 8

|  | Number of arrest points | Arrest point position 1 |
|---|---|---|
| P1R1 | 0 | / |
| P1R2 | 1 | 1.345 |
| P2R1 | 0 | / |
| P2R2 | 0 | / |
| P3R1 | 1 | 0.265 |
| P3R2 | 1 | 0.295 |
| P4R1 | 1 | 0.435 |
| P4R2 | 1 | 0.615 |
| P5R1 | 1 | 1.355 |
| P5R2 | 0 | / |
| P6R1 | 1 | 2.655 |
| P6R2 | 1 | 1.385 |

Figure 6:
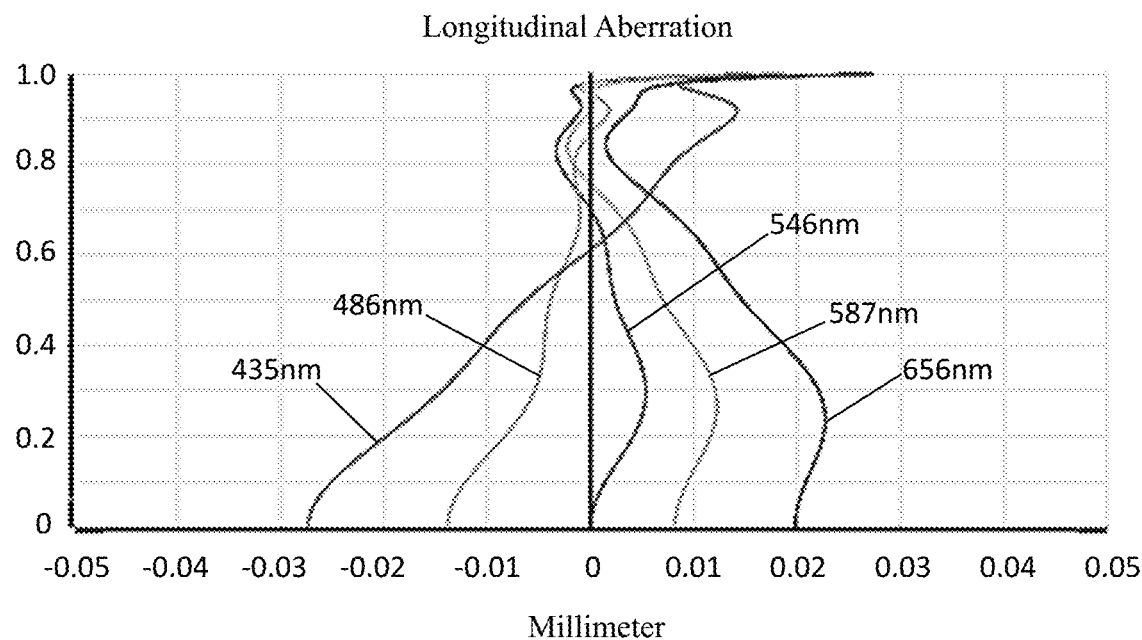
FIG. 6 is a schematic diagram of a longitudinal aberration of the camera optical lens shown in FIG. 5.
Figure 7:
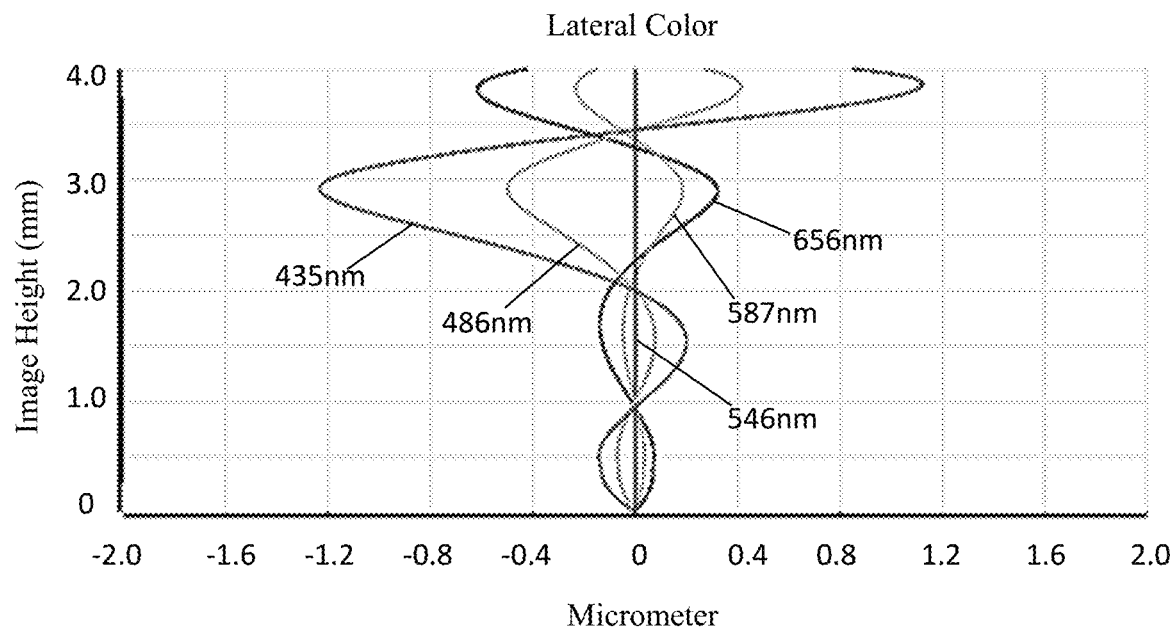
FIG. 7 is a schematic diagram of a lateral color of the camera optical lens shown in FIG. 5.
Figure 8:
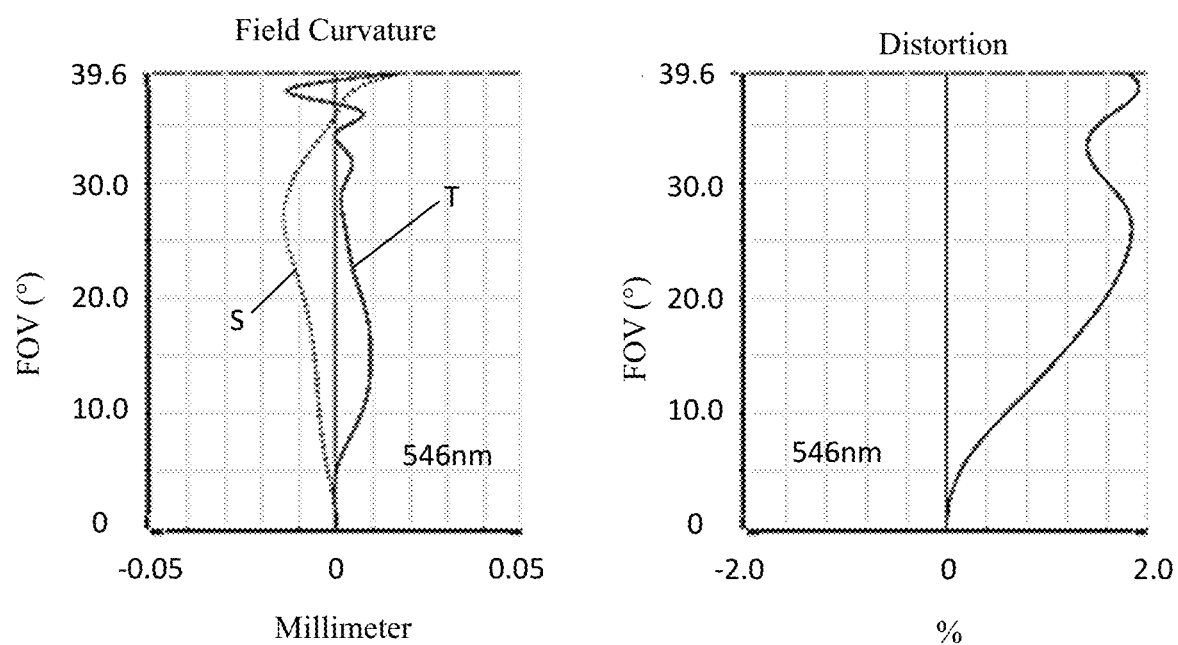
FIG. 8 is schematic diagrams of a field curvature and a distortion of the camera optical lens shown in FIG. 5.
Figure 9:
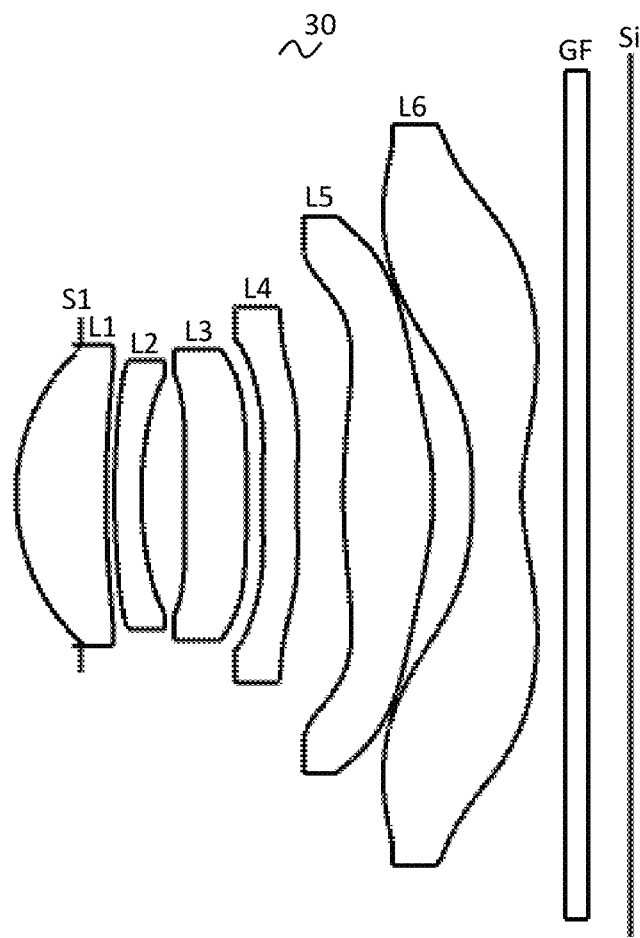
FIG. 9 is a schematic structural diagram of a camera optical lens according to a third embodiment of the present disclosure.

FIG. 6 and FIG. 7 respectively show schematic diagrams of a longitudinal aberration and a lateral color of light with wavelengths of 656 nm, 587 nm, 546 nm, 486 nm, and 435 nm after passing through the camera optical lens 20 in the second embodiment. FIG. 8 shows schematic diagrams of a field curvature and a distortion of light with a wavelength of 546 nm after passing through the camera optical lens 20 in the second embodiment.

As shown in Table 13, the camera optical lens of the second embodiment satisfies the conditional expressions.

In this embodiment, the camera optical lens has an entrance pupil diameter ENPD of 2.879 mm, a full field image height IH of 4.000 mm, and a field of view FOV in a diagonal direction of 79.20°, so that the camera optical lens 20 meets design requirements of a large aperture, a wide angle, and ultra-thinness, has fully corrected on-axis and off-axis aberration, and has excellent optical characteristics.

Third Embodiment

The third embodiment is basically the same as the first embodiment. Symbols have the same meanings as those in the first embodiment. Only differences therebetween will be listed below.

In this embodiment, the fourth lens L4 has positive refractive power.

Table 9 and Table 10 show design data of the camera optical lens 30 according to the third embodiment of the present disclosure.

TABLE 9

|  | R | d | | nd | | vd |
|---|---|---|---|---|---|---|
| S1 | ∞ | d0= | −0.603 | | | |
| R1 | 1.956 | d1= | 0.830 | nd1 | 1.5831 | v1 | 59.46 |
| R2 | 7.967 | d2= | 0.080 | | | |
| R3 | 6.060 | d3= | 0.250 | nd2 | 1.6700 | v2 | 19.39 |
| R4 | 3.402 | d4= | 0.404 | | | |
| R5 | 1.00E+10 | d5= | 0.565 | nd3 | 1.5444 | v3 | 55.82 |
| R6 | 43.234 | d6= | 0.154 | | | |
| R7 | 8.550 | d7= | 0.320 | nd4 | 1.6153 | v4 | 25.94 |
| R8 | 9.050 | d8= | 0.428 | | | |
| R9 | 6.480 | d9= | 0.832 | nd5 | 1.5346 | v5 | 55.69 |
| R10 | −2.531 | d10= | 0.358 | | | |
| R11 | −5.391 | d11= | 0.460 | nd6 | 1.5444 | v6 | 55.82 |
| R12 | 1.974 | d12= | 0.400 | | | |
| R13 | ∞ | d13= | 0.210 | ndg | 1.5168 | vg | 64.17 |
| R14 | ∞ | d14= | 0.400 | | | |

Table 10 shows aspheric data of respective lenses in the camera optical lens 30 according to the third embodiment of the present disclosure.

TABLE 10

| | conic coefficient | Aspheric coefficient | | | | |
|---|---|---|---|---|---|---|
| | k | A4 | A6 | A8 | A10 | A12 |
| R1 | −2.3279E−01 | 1.7534E−03 | 1.7007E−02 | −2.9111E−02 | 3.3550E−02 | −2.1097E−02 |
| R2 | 1.3246E+01 | −4.4356E−02 | 3.6377E−02 | −7.1133E−02 | 7.8753E−02 | −7.0551E−02 |
| R3 | 1.8668E+01 | −7.8865E−02 | 1.0551E−01 | −1.8753E−01 | 3.6000E−01 | −5.2193E−01 |
| R4 | 5.7563E+00 | −4.5147E−02 | 3.9523E−02 | −3.3666E−03 | −1.0209E−01 | 2.7163E−01 |
| R5 | 9.9000E+01 | −3.2382E−02 | −2.0313E−02 | 9.1373E−02 | −3.8651E−01 | 8.4711E−01 |
| R6 | 9.8877E+01 | −8.4526E−02 | −1.4364E−02 | 2.6875E−01 | −7.2251E−01 | 1.0003E+00 |
| R7 | −9.9000E+01 | −1.3650E−01 | −3.4706E−02 | 3.0254E−01 | −3.3241E−01 | 5.1322E−01 |
| R8 | −9.8994E+01 | −1.0490E−01 | −4.6346E−02 | 1.8909E−01 | −2.4549E−01 | 1.8664E−01 |
| R9 | −5.5727E+01 | 3.5780E−02 | −7.1869E−02 | 6.8089E−02 | −4.4885E−02 | 1.9362E−02 |
| R10 | −4.8298E+00 | 7.3653E−02 | −7.4303E−02 | 5.4100E−02 | −2.5280E−02 | 7.5035E−03 |
| R11 | −3.1116E−01 | −1.2004E−01 | 4.7025E−02 | −7.8010E−03 | 7.4229E−04 | −6.4008E−03 |
| R12 | −1.0637E+01 | −8.0831E−02 | 3.8587E−02 | −1.3632E−02 | 3.3430E−05 | −5.6035E−04 |

| | comic coefficient | Aspheric coefficient | | | |
|---|---|---|---|---|---|
| | k | A14 | A16 | A18 | A20 |
| R1 | −2.5279E−01 | 5.6584E−03 | 6.9688E−04 | −7.5196E−04 | 1.1253E−04 |
| R2 | 1.8246E+01 | 4.4315E−02 | −1.8174E−02 | 4.3737E−03 | −4.7081E−04 |
| R3 | 1.8668E+01 | 4.9160E−01 | −2.9276E−01 | 9.0385E−02 | −1.2324E−02 |
| R4 | 5.7563E+00 | −3.8654E−01 | 3.2046E−01 | −1.4443E−01 | 2.7464E−02 |
| R5 | 9.9000E+01 | −1.0935E+00 | 8.3051E−01 | −3.4390E−01 | 5.9987E−02 |
| R6 | 9.8877E+01 | −8.2916E−01 | 4.1461E−01 | −1.1557E−01 | 1.3828E−02 |
| R7 | −9.9000E−01 | −2.9056E−01 | 9.6696E−02 | −1.7478E−02 | 1.3022E−03 |
| R8 | −9.8994E+01 | −8.3959E−02 | 2.1856E−02 | −3.0488E−03 | 1.7675E−04 |
| R9 | −5.5727E−01 | −5.4171E−03 | 9.3488E−04 | −8.9016E−05 | 3.5459E−06 |
| R10 | −4.8298E+00 | −1.4383E−03 | 1.7391E−04 | −1.2097E−05 | 3.6873E−07 |
| R11 | −3.1116E−01 | 8.1207E−06 | −8.5454E−07 | 4.7995E−08 | −1.0726E−09 |
| R12 | −1.6037E+01 | 6.1454E−05 | −4.1343E−06 | 1.3640E−07 | −2.5109E−09 |

Table 11 and Table 12 show design data of inflection points and arrest points of respective lenses in the camera optical lens 30 according to the third embodiment of the present disclosure.

TABLE 11

| | Number of inflexion points | Inflexion point position 1 | Inflexion point position 2 | Inflexion point position 3 |
|---|---|---|---|---|
| P1R1 | 1 | 1.405 | / | / |
| P1R2 | 1 | 1.055 | / | / |
| P2R1 | 0 | / | / | / |
| P2R2 | 0 | / | / | / |
| P3R1 | 0 | / | / | / |
| P3R2 | 2 | 0.155 | 1.325 | / |
| P4R1 | 1 | 0.255 | / | / |
| P4R2 | 3 | 0.275 | 1.165 | 1.625 |
| P5R1 | 2 | 0.785 | 2.005 | / |
| P5R2 | 3 | 1.065 | 1.365 | 2.565 |
| P6R1 | 2 | 1.455 | 3.185 | / |
| P6R2 | 3 | 0.565 | 2.805 | 3.365 |

TABLE 12

| | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 1 | 0.265 |
| P4R1 | 1 | 0.445 |
| P4R2 | 1 | 0.475 |
| P5R1 | 1 | 1.275 |
| P5R2 | 0 | / |
| P6R1 | 1 | 2.675 |
| P6R2 | 1 | 1.355 |

Figure 10:
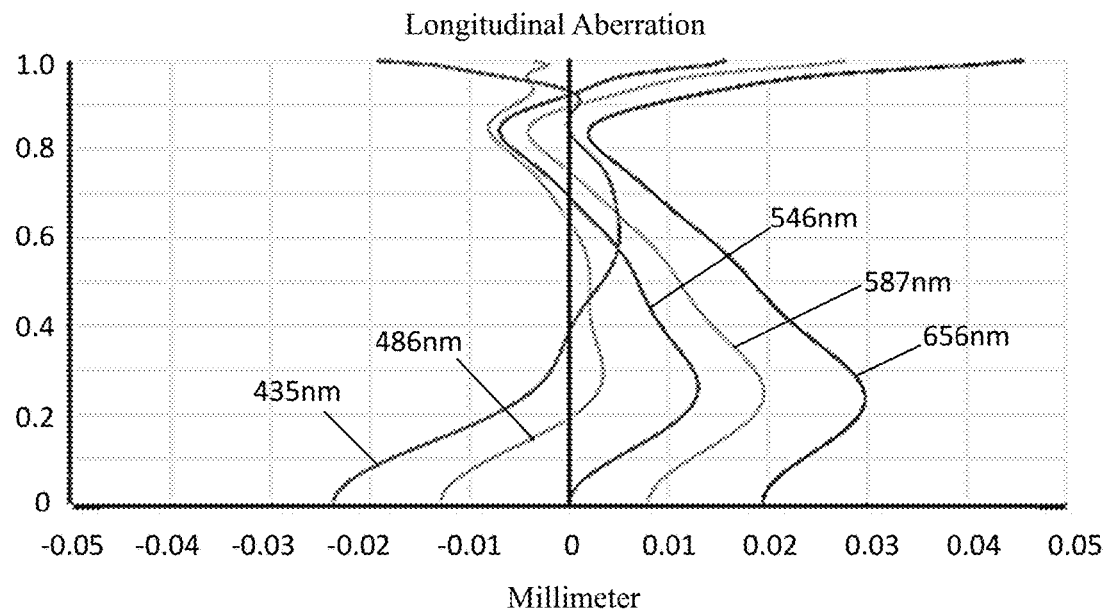
FIG. 10 is a schematic diagram of a longitudinal aberration of the camera optical lens shown in FIG. 9.
Figure 11:
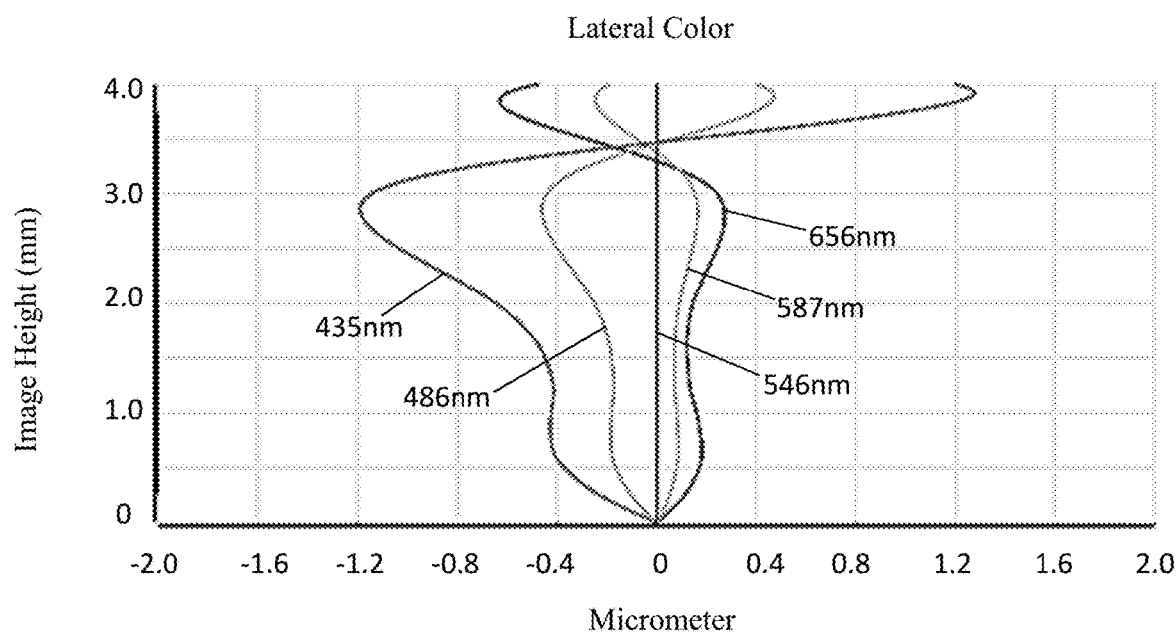
FIG. 11 is a schematic diagram of a lateral color of the camera optical lens shown in FIG. 9.
Figure 12:
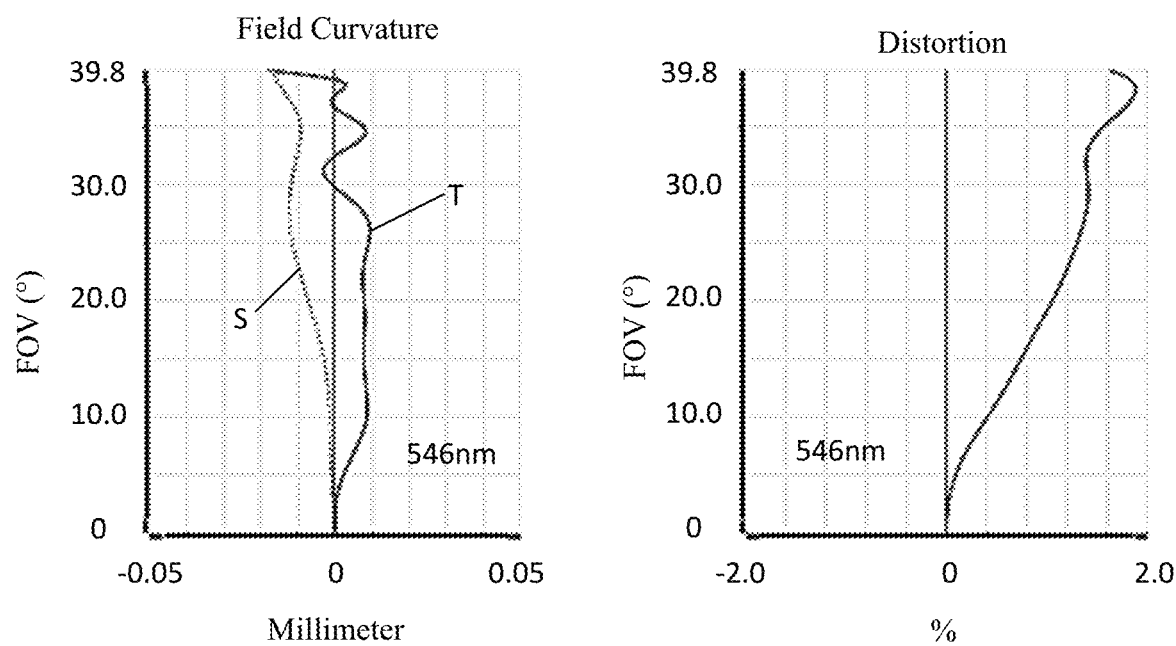
FIG. 12 is a schematic diagram of a field curvature and a distortion of the camera optical lens shown in FIG. 9.

FIG. 10 and FIG. 11 respectively show schematic diagrams of longitudinal aberration and lateral color of light with wavelengths of 656 nm, 587 nm, 546 nm, 486 nm, and 435 nm after passing through the camera optical lens 30 in the third embodiment. FIG. 12 shows a schematic diagram of field curvature and distortion of light with a wavelength of 546 nm after passing through the camera optical lens 30 in the third embodiment.

Table 13 below lists values corresponding to the conditional expressions in this embodiment according to the above conditional expressions. Apparently, the camera optical lens in this embodiment satisfies the above conditional expressions.

In this embodiment, the camera optical lens has an entrance pupil diameter ENPD of 2.861 mm, a full field image height IH of 4.000 mm, and a field of view FOV in a diagonal direction of 79.60°, so that the camera optical lens 30 meets design requirements of a large aperture, a wide angle, and ultra-thinness, has fully corrected on-axis and off-axis aberration, and has excellent optical characteristics.

TABLE 13

| Parameter and conditional expression | Embodiment 1 | Embodiment 2 | Embodiment 3 |
|---|---|---|---|
| v1 | 76.60 | 61.60 | 39.46 |
| R5/R6 | 3.22 | 2.52 | 231299440.26 |
| d9/d10 | 0.96 | 0.81 | 1.20 |
| f | 4.754 | 4.750 | 4.720 |
| f1 | 4.869 | 5.004 | 4.213 |
| f2 | −21.256 | −32.924 | −11.889 |
| f3 | −58.336 | −107.209 | −79.076 |
| f4 | −94.272 | −33.141 | 200.001 |
| f5 | 3.219 | 3.020 | 3.503 |
| f6 | −3.335 | −2.497 | −2.586 |
| FNO | 1.65 | 1.65 | 1.65 |
| TTL | 5.69 | 5.69 | 5.69 |
| IH | 4.000 | 4.000 | 4.000 |
| FOV | 79.20 | 79.20 | 79.60 |

Those of ordinary skill in the art can understand that the above embodiments are specific embodiments for implementing the present disclosure. In actual applications, various changes can be made to the forms and details thereof without departing from the spirit and scope of the present disclosure.

What is claimed is:

1. A camera optical lens, comprising from an object side to an image side:
a first lens having positive refractive power;
a second lens having negative refractive power;
a third lens having negative refractive power;
a fourth lens;
a fifth lens having positive refractive power; and
a sixth lens having negative refractive power,
wherein the camera optical lens satisfies:

$58.00 \le v1 \le 82.00;$ $2.30 \le R5/R6;$ and $0.80 \le d8/d10 \le 1.20,$ where v1 denotes an abbe number of the first lens,
R5 denotes a curvature radius of an object side surface of the third lens,
R6 denotes a curvature radius of an image side surface of the third lens,
d8 denotes an on-axis distance from an image side surface of the fourth lens to an object side surface of the fifth lens, and
d10 denotes an on-axis distance from an image side surface of the fifth lens to an object side surface of the sixth lens.

2. The camera optical lens as described in claim 1, further satisfying:

$-7.00 \le f2/f \le -2.50,$ where f denotes a focal length of the camera optical lens, and
f2 denotes a focal length of the second lens.

3. The camera optical lens as described in claim 1, further satisfying:

$0.45 \le f1/f \le 1.58;$ $-3.84 \le (R1+R2)/(R1-R2) \le -1.10;$ and $0.07 \le d1/TTL \le 0.23,$ where f denotes a focal length of the camera optical lens,
f1 denotes a focal length of the first lens,
R1 denotes a curvature radius of an object side surface of the first lens,
R2 denotes a curvature radius of an image side surface of the first lens,
d1 denotes an on-axis thickness of the first lens, and
TTL denotes a total optical length from the object side surface of the first lens to an image plane of the camera optical lens along an optic axis.

4. The camera optical lens as described in claim 1, further satisfying:

$1.78 \le (R3+R4)/(R3-R4) \le 14.51;$ and $0.02 \le d3/TTL \le 0.07,$ where R3 denotes a curvature radius of an object side surface of the second lens,
R4 denotes a curvature radius of an image side surface of the second lens,
d3 denotes an on-axis thickness of the second lens, and
TTL denotes a total optical length from an object side surface of the first lens to an image plane of the camera optical lens along an optic axis.

5. The camera optical lens as described in claim 1, further satisfying:

$-45.14 \le f3/f \le -8.18;$ $0.50 \le (R5+R6)/(R5-R6) \le 3.77;$ and $0.04 \le d5/TTL \le 0.15,$ where f denotes a focal length of the camera optical lens,
f3 denotes a focal length of the third lens,
d5 denotes an on-axis thickness of the third lens, and
TTL denotes a total optical length from an object side surface of the first lens to an image plane of the camera optical lens along an optic axis.

6. The camera optical lens as described in claim 1, further satisfying:

$-39.66 \le f4/f \le 63.56;$ $-70.40 \le (R7+R8)/(R7-R8) \le 26.46;$ and $0.03 \le d7/TTL \le 0.09,$ where f denotes a focal length of the camera optical lens,
f4 denotes a focal length of the fourth lens,
R7 denotes a curvature radius of an object side surface of the fourth lens,
R8 denotes a curvature radius of the image side surface of the fourth lens,
d7 denotes an on-axis thickness of the fourth lens, and
TTL denotes a total optical length from an object side surface of the first lens to an image plane of the camera optical lens along an optic axis.

7. The camera optical lens as described in claim 1, further satisfying:

$0.32 \le f5/f \le 1.11;$ $0.22 \le (R9+R10)/(R9-R10) \le 0.76;$ and $0.07 \le d9/TTL \le 0.22,$ where f denotes a focal length of the camera optical lens,
f5 denotes a focal length of the fifth lens,
R9 denotes a curvature radius of the object side surface of the fifth lens,
R10 denotes a curvature radius of the image side surface of the fifth lens,
d9 denotes an on-axis thickness of the fifth lens, and TTL denotes a total optical length from an object side surface of the first lens to an image plane of the camera optical lens along an optic axis.

8. The camera optical lens as described in claim 1, further satisfying:

$-1.10 \leq f6/f \leq -0.35;$ $0.20 \leq (R11+R12)/(R11-R12) \leq 0.70;$ and $0.04 \leq d11/TTL \leq 0.13,$ where f denotes a focal length of the camera optical lens,
f6 denotes a focal length of the sixth lens,
R11 denotes a curvature radius of the object side surface of the sixth lens,
R12 denotes a curvature radius of an image side surface of the sixth lens,
d11 denotes an on-axis thickness of the sixth lens, and
TTL denotes a total optical length from an object side surface of the first lens to an image plane of the camera optical lens along an optic axis.

9. The camera optical lens as described in claim 1, further satisfying:

$TTL/\mathrm{IH} \leq 1.43,$ where IH denotes an image height of the camera optical lens, and
TTL denotes a total optical length from an object side surface of the first lens to an image plane of the camera optical lens along an optic axis.

10. The camera optical lens as described in claim 1, wherein the first lens is made of glass.

* * * * *